US010186716B2

(12) United States Patent
Madabusi et al.

(10) Patent No.: US 10,186,716 B2
(45) Date of Patent: Jan. 22, 2019

(54) NON-AQUEOUS FLOW CELL COMPRISING A POLYURETHANE SEPARATOR

(71) Applicant: Chemtura Corporation, Middlebury, CT (US)

(72) Inventors: Venkatramanan K Madabusi, Naugatuck, CT (US); Joseph F Stieber, Prospect, CT (US); Kevin Jackson, Woodbury, CT (US); George Brereton, Mahopac, NY (US); Fei Wang, Mansfield, MA (US); Dharmasena Peramunage, Norwood, MA (US)

(73) Assignee: LANXESS SOLUTIONS US INC., Middlebury, CT (US)

(*) Notice: Subject to any disclaimer, the term of this patent is extended or adjusted under 35 U.S.C. 154(b) by 50 days.

(21) Appl. No.: 15/059,339

(22) Filed: Mar. 3, 2016

(65) Prior Publication Data

US 2016/0181626 A1  Jun. 23, 2016

Related U.S. Application Data

(63) Continuation-in-part of application No. 14/880,300, filed on Oct. 12, 2015.

(60) Provisional application No. 62/147,311, filed on Apr. 14, 2015, provisional application No. 62/077,366, filed on Nov. 10, 2014.

(51) Int. Cl.
| | |
|---|---|
| *H01M 8/18* | (2006.01) |
| *H01M 8/0221* | (2016.01) |
| *H01M 8/0228* | (2016.01) |
| *H01M 8/0239* | (2016.01) |
| *H01M 8/20* | (2006.01) |
| *H01M 8/0234* | (2016.01) |

(52) U.S. Cl.
CPC ....... *H01M 8/0239* (2013.01); *H01M 8/0221* (2013.01); *H01M 8/0228* (2013.01); *H01M 8/0234* (2013.01); *H01M 8/188* (2013.01); *H01M 8/20* (2013.01); *H01M 2300/0028* (2013.01); *Y02E 60/528* (2013.01)

(58) Field of Classification Search
CPC ............. H01M 8/0239; H01M 8/0221; H01M 8/0228; H01M 8/0234; H01M 8/188; H01M 8/20
See application file for complete search history.

(56) References Cited

U.S. PATENT DOCUMENTS

| | | | |
|---|---|---|---|
| 6,866,965 B2 | 3/2005 | Lee et al. | |
| 8,722,226 B2 | 5/2014 | Chiang et al. | |
| 8,778,552 B2 | 7/2014 | Chiang et al. | |
| 2002/0061449 A1 | 5/2002 | Maruo et al. | |
| 2008/0292964 A1* | 11/2008 | Kazacos | B60L 11/1879 |
| | | | 429/231.5 |
| 2010/0047671 A1 | 2/2010 | Chiang et al. | |
| 2011/0135988 A1 | 6/2011 | Shunsuke | |
| 2011/0135989 A1 | 6/2011 | Shunsuke | |
| 2011/0183567 A1* | 7/2011 | Vedula | D01D 5/0985 |
| | | | 442/328 |
| 2012/0214375 A1 | 8/2012 | Kitano et al. | |
| 2013/0224557 A1 | 8/2013 | Hayakawa et al. | |
| 2014/0255821 A1* | 9/2014 | Katayama | H01M 8/188 |
| | | | 429/492 |
| 2014/0370403 A1 | 12/2014 | Narayan et al. | |
| 2014/0370404 A1* | 12/2014 | Kato | H01M 8/1058 |
| | | | 429/418 |

FOREIGN PATENT DOCUMENTS

| | | |
|---|---|---|
| CN | 101794889 A | 8/2010 |
| CN | 202651269 U | 1/2013 |
| EP | 2922114 A1 | 9/2015 |
| JP | H05-226002 A | 9/1993 |
| JP | 2004031084 A | 1/2004 |
| JP | 4697901 B1 | 6/2011 |
| KR | 20140063479 A | 9/2015 |
| WO | 0103221 A1 | 1/2001 |
| WO | 2013062990 A2 | 5/2013 |

OTHER PUBLICATIONS

PCT International Search Report and Written Opinion dated Jan. 22, 2016 from corresponding Application No. PCT/US2015/055054, pages.
Extended European Search Report dated Aug. 4, 2016 from corresponding EP Application No. 16165202.9.

* cited by examiner

*Primary Examiner* — Jonathan G Jelsma
(74) *Attorney, Agent, or Firm* — Dilworth IP, LLC

(57) ABSTRACT

A non-aqueous flow cell energy storage device comprises a ionically conductive separator, which separator comprises a polyurethane prepared by curing an isocyanate capped prepolymer, which prepolymer was prepared from a polyol having polycarbonate backbone, wherein the separator may be impregnated with electrolyte salts and/or swelled by an organic solvent.

20 Claims, No Drawings

NON-AQUEOUS FLOW CELL COMPRISING A POLYURETHANE SEPARATOR

This application is a continuation-in-part of U.S. patent application Ser. No. 14/880,300, filed Oct. 12, 2015, which claims priority to U.S. Prov. Appl. No. 62/077,366 filed Nov. 10, 2014; and further, this application claims benefit under 35 USC 119(e) of U.S. Prov. Appl. No. 62/147,311 filed on Apr. 14, 2015.

STATEMENT REGARDING FEDERALLY SPONSORED RESEARCH OR DEVELOPMENT

This invention was made with United States government support under Cooperative Research and Development Agreement No: CRD-14-54 awarded by the Department of Energy. The government has certain rights in this invention.

The invention provides a non-aqueous flow cell device comprising an ionically conductive polyurethane separator comprising a polycarbonate based polyurethane. The separator of the invention offers improvements in performance and construction for non-aqueous flow cells that comprise highly polar organic solvents.

Various forms of electrochemical cells are widely known as energy storage devices. In general terms, the energy is stored by separating chemical agents with differing electrochemical potentials, e.g., an ion source and an ion sink, and associating each of the chemical agents with an electrode so that the difference in electrochemical potentials of the chemical agents produces a voltage difference between the two electrodes, i.e., anode and cathode. When the electrodes are connected by a conductive element the cell discharges and an electric current is produced that flows through the connecting conductive element from anode to cathode. In a properly functioning cell or battery, the flow of electrons occurs between the two electrodes outside of the cell, while cations flow internally between the electrodes to maintain a charge balance. Because a charge imbalance cannot be sustained between the negative electrode and positive electrode, these two flow streams supply ions and electrons at the same rate.

For example, in the common rechargeable lithium ion secondary battery, as power is drawn from the cell, electrons flow from the anode to the cathode, lithium cations of the electrolyte, i.e., the working electrolyte, flow to balance the charge and complete the electrochemical reaction. To avoid a short circuit within the electrochemical cell, the two electrodes are typically separated by a layer or membrane that is electrically insulating but permeable to the flow of the cations. The battery is recharged by applying an opposing voltage difference that drives electric current and ionic current in an opposite direction as that of a discharging battery in service.

In common usage, the distinction between an electrochemical "cell" and a "battery", which typically comprises more than one electrochemical cell, has been lost and the terms are generally interchangeable.

Redox flow batteries, also known as a flow cells or redox batteries or reversible fuel cells are energy storage devices in which the chemical agents with differing electrochemical potentials are two reversible redox couples that are each part of a flowable electrolyte. During discharge, one of the redox couples undergoes oxidation liberating electrons, while the other undergoes reduction and accepts the electrons. The redox reactions occur in the vicinity of electrodes or current collectors, which do not participate in the redox reaction but allow the electrons to flow from the anode region to the cathode region. Being part of a flowable electrolyte means that the redox couples can flow through the areas where the current collectors reside, undergo the respective redox reactions, and the flow out of the area while more of the electrolyte flows in.

One can recharge a flow cell by reversing the flow of electrolytes while applying an opposing voltage difference, or one can replace the spent flowable electrolytes with fresh materials by refilling or changing out the electrolyte reservoirs. The recovered or spent electrolyte material can be regenerated at another time or by alternate means if desired. Recharge times for flow cells can be much shorter than those required for recharging other energy storage devices, which can be a significant advantage, e.g., in a battery driven electric cars on a long trip.

WO 01/03221 discloses an energy storage device comprising (a) a redox flow cell comprising (i) a cathode chamber, (ii) an anode chamber, and (iii) an ion-permeable diaphragm between these chambers; (b) two electrolyte containers, one container each for the liquid positive electrode material and the liquid negative electrode material, and (c) a pumping system to ensure the circulation of the liquid electrode materials from the containers to cathode and anode chamber of the flow cell and back to the containers.

In many known flow cells the positive and negative electrode reactants are soluble metal ions in liquid solution that are oxidized or reduced during the operation of the cell. Such flow cells may be limited by their energy density, being in large part determined by the solubility of the metal ion redox couples in liquid solvents, which may be relatively low. Flow cells comprising organic redox couples in liquid solutions are also known.

US 2010/0047671 discloses that instead of solutions of electrolytes, dispersions of electrolytes, such as particles dispersed in a carrier or emulsions, can be used as flowable redox electrolytes in flow cells. U.S. Pat. Nos. 8,722,226 and 8,778,552 disclose flowable electrolytes that are in the form of slurries, semi-solids, and condensed liquids of electrolytic material. The amount of redox active material contained within a given volume can therefore be increased, creating higher energy density, and providing the battery with a greater charge.

In flow cells, as in conventional batteries, an electrically insulating but cation permeable layer or membrane, i.e., a separator, is located between the anodic region and the cathodic region. The separator must be resistant to mechanical, chemical and electrical stresses and prevent the contact of anodic materials with cathodic materials while allowing for rapid ion transport. For example, separators must not exhibit heat shrinkage or other deformation and must avoid excessive swelling when contacted with solvents while maintaining a high rate of ion transport.

JP Patent Pub. No. 2004-31084 discloses a separator for non-aqueous batteries comprising a polymer resin coating layer having fine pores on one surface of a base material. The separator has some ability to swell with liquid electrolyte and prevents internal shorting following detachment and movement of electrode active materials.

US Patent Appl. Pub. 2013/0224557 discloses a separator for non-aqueous batteries comprising a base layer comprising a fiber aggregate ensure the strength of the separator, and a layer of a particular electrolyte-swellable urethane resin to reduce the resistance of the separator due to the urethane resin's ability to swell with liquid electrolyte. The urethane resin is obtained by reacting a polyol containing a vinyl polymer and a polyether polyol with a polyisocyanate.

WO 2013062990 discloses a membrane useful as a separator in a rechargeable lithium battery comprising a thermoplastic poly(dialkylene ester) derived polyurethane composition capable of swelling with adsorbed liquid electrolyte. Also disclosed is the incorporation of fillers, including lithium salts, into the polyurethane resin.

JP Patent Pub. No. H5-226002 discloses a gel electrolyte for lithium secondary batteries comprising an ether-based polyurethane, LiPF6, and propylene carbonate. The gel electrolyte is said to swell with a liquid electrolyte and provide a lithium secondary battery with excellent interfacial impedance by improving contact between the electrodes and the electrolyte.

U.S. Pat. No. 6,866,969 discloses method for preparing a cross-linked polyether electrolyte by crosslinking a mixture comprising an isocyanate terminated pre-polymer having a polyethylene oxide backbone, with a glycerol ethoxylate and/or glycerol propoxylate cross-linking agent, an organic solvent and a lithium salt, which electrolyte can serve as a separator in a lithium ion battery.

US Patent Application 2002/0061449 discloses an ion-conductive composition, suitable for use as a gel electrolyte separator for a lithium battery, comprising a thermoplastic polyurethane resin prepared by reacting a polyol compound with a polyisocyanate compound and a chain extender.

Many flow cells are aqueous, i.e., the electrolytes used therein are typically dissolved, suspended, or mixed with water, and the cation that flows internally to balance the charge is often hydrogen. The most commonly encountered separators found in flow cells are based on ion exchange membranes such as those comprising NAFION, a perfluorosulfonic acid membrane that binds cations, or AMBERLYST. NAFION and NAFION modified with e.g., $SiO_2$, $TiO_2$, ZrP, sulfonated polymers, etc., are the most prevalent. NAFION and AMBERLYST separators are more suited for aqueous systems than for systems employing organic solvents. The use of organic polymers in separators for flow cells is also known.

U.S. Pat. No. 8,722,226 discloses flow cell wherein a polyethylene oxide polymer is used in an ionically transporting separator membrane. For example, an electrolyte comprising a polyethyleneoxide (PEO) polymer in which a lithium salt is complexed to provide lithium conductivity, can be used as the separator membrane, which is pinhole-free and a solid ionic conductor, optionally stabilized with other membranes such as glass fiber separators as supporting layers.

US 2014/0370403 discloses a metal-free organic redox flow battery wherein each flowable redox electrolyte comprises organic molecules, e.g., variously substituted quinones and hydroquinones, and water; the working electrolyte is hydrogen cation; and the separator is a membrane comprising perfluorinated NAFION or an interpenetrating polymeric network of polystyrenesulfonic acid with polyvinylidenefluoride (PSSAPVDF). The latter type of membrane is sulfonated to produce a proton conducting membrane having conductivity in the range of 50-75 $mS^{-1}$, which is comparable to NAFION. A membrane-electrode assembly is formed by applying an ink comprising high surface area carbon and ionomer materials to the surface of the membrane upon which a porous conductive paper of graphite fibers is hot pressed.

There is a need for energy storage devices such as flow cells with increased power and energy densities and separators play a key role in such systems. Thus it is well understood in the art that there is a need for improved separators for use in flow cells, particularly for non-aqueous flow cells. Improvements in ion selectivity, permeability and conductivity are needed as are greater mechanical stability and lower costs. Many currently available NAFION based separators and separators comprising polymers such as polyethylene and polypropylene exhibit poor conductivity in non-aqueous systems. Separators comprising polyether polymers, such as those with polyethylene oxides, often swell excessively in the presence of organic solvents useful in flow cells, making them a poor fit for flow cell use. Polycarbonate based polyurethane compositions have been identified which have excellent properties for use in ion permeable separators for non-aqueous flow cells.

SUMMARY OF THE INVENTION

The flow cell of the present invention is a non-aqueous flow cell comprising flowable non-aqueous organic electrolytes and a separator comprising an ionically conducting polycarbonate based polyurethane that maintains dimensional stability when exposed to organic solvents useful in non-aqueous flow cells.

"Non-aqueous" means that the flowable electrolytes and flow cell as a whole contain little to no water. For example, any, carrier solvents for the flowable electrolytes, any solvent present as part of the separator, e.g., as part of a gel separator or used to swell the polyurethane, contain little to no water, e.g., 0 to 10% by weight, and depending on the solvent, 0 to 5% generally 0 to 2% water. In general, any water that is present is a small and acceptable amount due to the great affinity for water seen with many components useful in the flow cell, e.g., polar solvents or salts.

To be useful in the separator of a flow cell, the polyurethane must allow ion transport between the anode and cathode region without allowing passage of the organic redox materials. The rate of ion transport through organic polymers is often increased when the polymer is swelled by a solvent, and improvements are also frequently observed when a material such as a metallic salt is embedded in the polymer. However, it is important that a polymer not gain too much weight or increase too much in size when swelled with a solvent as the dimensional changes of the separator, for example, can render it unsuitable for the device.

Polyurethane polymers, prepared by curing or crosslinking a mixture comprising an isocyanate terminated pre-polymer having a polycarbonate backbone, have been discovered to be extremely useful as ion transport membranes, or as components of, ion transport membranes in flow cells. The polycarbonate based polyurethanes can be prepared using known methods or simple variations of known methods such as those disclosed herein. The separators comprising the polymers of the invention can be swelled by absorption of organic solvents and can be embedded with inorganic salts without sacrificing physical or chemical properties and do not swell excessively in the presence of many useful organic solvents.

DESCRIPTION OF THE INVENTION

A non-aqueous flow cell comprising an anode region, a cathode region and an ion permeable separator comprising a polyurethane situated between the anode region and cathode region wherein:

the anode region comprises the elements that house and are associated with electron release during discharge of the cell, comprising at least an anode chamber, a current collector residing within the anode chamber, and a non-aqueous flowable organic anode electrolyte that undergoes oxidation during discharge and an organic solvent, and optionally comprising, e.g., storage for the flowable electrolyte, storage the for discharged, i.e., oxidized, electrolyte, the cathode region comprises the elements that house and are associated with receiving electrons during discharge of the cell, comprising at least a cathode chamber, a current collector residing within the cathode chamber, and a non-aqueous flowable organic cathode electrolyte that undergoes reduction during discharge and organic solvent, and optionally comprising, e.g., storage for the flowable electrolyte, storage for the discharged, i.e., reduced, electrolyte, etc., and the separator comprises a polycarbonate based polyurethane, which polycarbonate based polyurethane in many embodiments further comprises a metal salt and/or an organic solvent, in many embodiments the separator comprises a polycarbonate based polyurethane comprising both a metal salt and an organic solvent, wherein each of the anode electrolyte, the cathode electrolyte and the separator comprise less than 10% by weight of water, typically less than 5% and often less than 2% water.

The flow cell will also typically comprise a means for moving the flowable electrolytes, e.g., a pump, and may further comprise other components useful in the operation of a flow cell.

The "anode chamber" is the space in which the flowable electrolyte of the anode contacts a current collector to release electrons during discharge mode; the "cathode chamber" is the space in which the flowable electrolyte of the cathode contacts the current collector to accept electrons during discharge mode. Generally, the ion conducting separator defines a boundary of both the anode chamber and the cathode chamber. During charging of the cell, the electron flow is reversed and the chemically active redox agents of the electrolyte of the anode region are reduced and the chemically active redox agents of the electrolyte of the cathode region are oxidized.

Many materials for, and various constructions of, current collectors useful in flow cells are known in the art and any such material or construction compatible with a non-aqueous flow cell can be used for the current collectors in the flow cell of the invention. The current collector is associated with, i.e., connected to, an electrode that allows for electron flow outside of the cell. The current collector can also serve as the electrode. In many embodiments the current collector and the electrode are different components that can be made from the same materials or different materials. In one particular embodiment, the separator forms a boundary between the anode chamber and the cathode chamber and is closely associated, i.e., in contact with, the current collector and/or electrode of each of the anode and cathode chambers. Materials useful as electrodes are also known in the art.

Likewise, organic redox active compounds useful as chemical agents with differing electrochemical potentials in which to store electric energy are known and any such material compatible with a non-aqueous flow cell can be used in the flowable electrolytes of the present flow cell. The flowable electrolytes can be in the form of a solution, slurry or dispersion of the organic redox active compounds in an organic carrier solvent, or the flowable electrolyte may be in the form of condensed organic liquid, which liquid consists of one or more active redox materials, or the electrolyte may comprise a solution or mixture of such liquid redox materials with a diluent and/or an additive useful for increasing the efficiency of such an electrolyte. The flowable electrolyte may also comprise various other components such as an inert salt or a salt useful in cation transport through the separator.

The separator comprises a polyurethane polymer prepared from an isocyanate capped polycarbonate polyol prepolymer, which polymer may be an elastomeric or thermoplastic polyurethane, and may be part of a polymer blend with other polyurethane polymers and/or non-urethane polymers. The polyurethane of the separator typically further comprises a metal salt, e.g., a lithium or sodium salt, and is often swelled by the presence of an organic solvent. The separator of the invention can be in the form of a self supporting polymer film, a gel electrolyte, a polymer matrix comprising a metal salt and/or organic solvent, a polymer matrix comprising a solution of an electrolyte salt in an organic solvent, a layered or laminated object wherein one of the layers comprises the polyurethane of the invention, a polymer matrix comprising the polyurethane of the invention supported on a mesh, etc. The separator of the invention and the current collector of the anode and/or cathode region may be part of a membrane-current collector or membrane-electrode assembly as described in US 2014/0370403. In many embodiments the separator comprises the polyurethane of the invention as a non-porous polyurethane film or substrate, meaning that it has a continuous surface without pores or holes.

The polycarbonate polyurethane of the invention will swell when contacted with certain organic solvents, but without the excessive swelling that prevents the use of some other polymers. The polyurethanes used in the inventive separators are easily processed and have excellent mechanical and dimensional strength for resisting shrinking or deformation.

Polycarbonate based polyurethanes useful in the separators of the invention are prepared by curing a mixture comprising a curing agent and an isocyanate terminated pre-polymer having a polycarbonate backbone, which pre-polymer is prepared by reacting a mixture comprising an isocyanate monomer, i.e., a polyisocyanate, and a polycarbonate polyol, or a mixture of polyols, wherein at least one polyol is a polycarbonate polyol. The polycarbonate based polyurethane may be prepared from more than one prepolymer, for example, the polycarbonate based polyurethane may be prepared by curing a mixture comprising an isocyanate terminated prepolymer having a polycarbonate backbone and an isocyanate terminated prepolymer having a polyether or polyester backbone.

In some embodiments of the invention, the polyurethane polymer is prepared by a process that comprises curing a low free isocyanate prepolymer, i.e., less than 1% by weight of free isocyanate monomer, with a curing agent to form the polyurethane polymer. In some embodiments the prepolymer is very low in free polyisocyanate content, e.g., less than 1% by weight, often less than 0.5% and frequently less than 0.1% by weight.

Many isocyanate monomers and polycarbonate polyols are known in the art, including, for example, polycarbonate polyols prepared from the reaction of alkyl or aryl carbonates with alkane diols or triols, aryl diols or triols, polyether polyols, polyester polyols and the like.

In some embodiments, the polycarbonate based polyurethane prepolymer is prepared from a mixture comprising more than one isocyanate monomer and/or more than one polyol. For example, the polyol may comprise a mixture of polycarbonate polyols, or a mixture comprising one or more polycarbonate polyol with other polyols such as polyol ether polyols, e.g., polyethylene glycol (PEG), polypropylene glycol (PPG), poly tetramethylene glycol (PTMG), polyester polyols, alkyl polyols, caprolactone polyols, etc. Typically at least 50, 60, 70, 80, 90, 95 wt % or more, based on the total weight of all polyols in the mixture, is one or more polycarbonate polyols. In many embodiments 90 to 100% or 95 to 100% of all polyols in the mixture, is one or more polycarbonate polyols.

A wide variety of polyisocyanate monomers are known and any that provide a polycarbonate based polyurethane with the desired properties can be employed. Typically, di-isocyanates make up the majority of the polyisocyanate monomers used as large quantities of tri- and tetra-isocyanates etc., can provide undue crosslinking. Aliphatic diisocyanates or aromatic diisocyanates, and mixtures of isocyanate monomers may be used. Common aliphatic diisocyanates include 1,6-hexane diisocyanate (HDI), isophorone diisocyanate (IPDI), and methylene bis (p-cyclohexyl isocyanate) ($H_{12}MDI$), dibenzyl-4,4'-diisocyanate, isophorone diisocyanate (IPDI), 1,3 and 1,4-xylene diisocyanates, 1,3-cyclohexyl diisocyanate, and 1,4-cyclohexyl diisocyanate (CHDI). Common aromatic diisocyanates include diphenylmethane diisocyanate (MDI), polymeric MDI, toluene diisocyanate (TDI), naphthalene diisocyanate (NDI), 3,3'-bitoluene diisocyanate (TODI), diphenyl 4,4'-diisocyanate (DPDI), tetramethylxylylene diisocyanate (TMXDI), para-phenylene diisocyanate (PPDI), stilbene-4, 4'-diisocyanate, and benzophenone-4,4'-diisocyanate.

For example, the diisocyanate monomers are selected from PPDI, MDI, TDI, HDI and $H_{12}MDI$, and in many embodiments the diisocyanate monomers are selected from PPDI, TDI and MDI.

Curing agents, also called coupling agents or cross linking agents, are well known in the art and any that provide a polycarbonate based polyurethane with the desired properties can be employed. In many embodiments the curing agent comprises, for example, a diol, triol, tetrol, diamine or diamine derivative. More than one curing agent may be used.

In some embodiments the curing agent comprises a diol or other polyol, for example, diols useful in the invention include $C_{2-12}$ diols such as ethylene glycol, diethylene glycol, propylene glycol, dipropylene glycol, 1,4-butanediol, 1,6-hexanediol, 1,3-butanediol, 1,5-pentanediol, cyclohexanedimethanol (CHDM), neopentylglycol, di(hydroxymethyl)benzene, hydroquinone, hydroquinone bis (hydroxylethyl ether) also known as 1,4-di(2-hydroxyethoxy) benzene or HQEE, resorcinol, bis(beta-hydroxyethyl)ether also known as 1,3-di(2-hydroxyethyl) benzene; catechol, bis(beta-hydroxyethyl)ether also known as 1,2-di(2-hydroxyethoxy)benzene and the like. The curing agent may also comprise polyether polyols such as PTMG, polyester polyols, polycaprolactone polyols or polycarbonate polyols.

A mixture of two or more glycols may be used as the curing agent. In certain particular some embodiments, the chain extender comprises one or more of HQEE, 1,4-butanediol, 1,6-hexanediol and cyclohexanedimethanol, e.g., a mixture of HQEE and 1,4-butanediol; a mixture of 1,4-butanediol and cyclohexanedimethanol; a mixture of HQEE, 1,4-butanediol and cyclohexanedimethanol; and the like.

In some embodiments the curing agent comprises a diamine or other polyamine or derivative thereof, for example, diamine or diamine derivatives using in the present invention include methylene dianiline, methylene bis chloroaniline, ethylene bis orthochloroaniline, 4,4'-methylene-bis(3-chloro-2,6-diethyl)aniline, dimethylthio-2,4-toluene-diamine, di-p-aminobenzoate, phenyldiethanol amine mixture, methylene dianiline sodium chloride complex and the like. Mixtures comprising more than one diamine or diamine derivatives may be used. Also, mixtures comprising amine base curing agents and polyol curing agents may be used.

In many instance the curing agent comprises butane diol or a dianiline compound.

Typically, the polyols, polyisocyanates, and curing agents above are all known materials.

Ion transport is often more efficient through polymeric substrates when swelled with an appropriate solvent and typically the separator of the invention comprises a polycarbonate based polyurethane polymer swelled by an organic solvent. In many embodiments the polycarbonate based polyurethane used in the separator comprises both a solvent and a salt. Separators of the invention have been shown to provide acceptable conductivity, typically in the range of $10^{-5}$ to $10^{-3}$ Siemens/cm, e.g., $10^{-4}$ to $10^{-3}$ Siemens/cm.

The flowable electrolytes of the flow cell of the invention also typically comprise an organic solvent. Generally, solvents useful in the flowable electrolytes are also useful as solvents used to swell the polyurethane of the separator. In embodiments wherein the separator and electrolytes comprise a solvent, it is recommended that the same solvent be used in both separator and electrolyte. Further, when the separator comprises a salt soluble in the electrolyte, it is recommended that the same salt be present in the electrolyte.

Solvents useful in both flowable electrolytes and the separator are known and include esters, ethers, amides, sulfolanes, ketones, sulfoxides and the like. Well known examples include cyclic carbonic acid esters, acyclic carbonic acid esters, cyclic carboxylic acid esters etc. For example:

cyclic carbonate esters such as ethylene carbonate, propylene carbonate, butylene carbonate and the like;

acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, and the like; other esters such as butyrolactone, ethyl acetate, methyl propionate, ethyl propionate, etc.;

acetals, ethers and polyglymes such as dimethoxyethane, diethoxyethane, tetrahydrofuran, 2-methyl tetrahydrofuran, 1,3-dioxolane, 4-methyl-1,3-dioxolane, dialkyl ethers, diethyleneglycol dimethylether, diethyleneglycol diethylether, and triethyleneglycol diethylether (tetraglyme) etc.;

fluorobenzenes such as 2-fluorobenzene, 3-fluorobenzene, 4-fluorobenzene;

sulfoxides and sulfolanes such as dimethylsulfoxide, sulfolane, methylsulfolane etc.;

amides and nitriles such as dimethylformamide, dimethyl acetamide, N-methyl-2-pyrrolidone, acetonitrile, propiononitrile and the like.

For example, ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, butyrolactone, 1,3-dioxolane, 4-methyl-1,3-dioxolane, diethyleneglycol diethylether, and triethyleneglycol diethylether dimethylsulfoxide, dimethylformamide, dimethyl acetamide, N-methyl-2-pyrrolidone or acetonitrile.

In many embodiments, the polycarbonate based polyurethane comprises a salt, for example, a metal salt such as a lithium, sodium, potassium, cesium salt, typically a lithium or sodium salt.

In many embodiments, the salt is a lithium salt, such as lithium halides, lithium borates, lithium aluminates, lithium aluminosilicates, lithium-containing zeolites, micas, lithium carbides, $Li_3N$, lithium oxides, lithium mixed oxides, lithium phosphates, lithium carbonate, lithium silicates, lithium sulfides, lithium sulfates. For example, common electrolyte salts useful in the present separator include lithium hexafluorophosphate ($LiPF_6$), lithium tetrafluoroborate ($LiBF_4$), lithium perchlorate ($LiClO_4$), LiSCN, lithium tetrachloroaluminate ($LiAlCl_4$), lithium bromide (LiBr), lithium hexafluoroarsenate ($LiAsF_6$), lithium trifluoromethanesulfate ($LiCF_3SO_3$), lithium trifluoroacetate ($LiCF_3CO2$), lithium hexafluoroantimonate ($LiSbF_6$), lithium lower fatty acid carboxylates, LiCl, Lil, lithium bis(trifluoromethanesulfonyl) imide $Li(CF_3SO_2)_2N$, lithium bis(pentafluoroethanesulfonyl) imide ($Li(C_2F_5SO_2)_2N$), lithium trifluorosulfonate ($LiCF_3SO_3$), $LiC_4F_9SO_3$, $Li(CF_3SO_2)_3C$, chloroborane lithium, lithium tetraphenylborate ($LiBPh_4$), and $Li(CF_3SO_2)(CF_3CO)N$. For example, in certain embodiments the lithium salt comprises a salt selected from $LiPF_6$, $LiBF_4$, $LiClO_4$, $LiAlCl_4$, LiBr, $LiAsF_6$ and $Li(CF_3SO_2)_2N$.

For example, in particular embodiments, the separator comprises acetonitrile or a cyclic carbonate ester such as ethylene carbonate or propylene carbonate, and a salt selected from $LiPF_6$, $LiBF_4$, $LiClO_4$, $LiAsF_6$ and $Li(CF_3SO_2)_2N$, e.g., $Li(CF_3SO_2)_2N$.

A salt can be incorporated into the separator of the invention, typically into the polycarbonate based polyurethane, in a variety of ways. For example, the salt may already be incorporated into the polycarbonate based prepolymer, the salt may be incorporated into the polycarbonate based polyurethane during cure, or the salt may be incorporated into the polycarbonate based polyurethane after the polymer is cured.

In one embodiment a salt is dissolved or suspended in a polyol that is then reacted with an isocyanate monomer to prepare a polyurethane prepolymer. Conversely, the salt can be mixed with the isocyanate monomer before reaction. An organic solvent may be used to assist in the dissolution or suspension of the salt.

In another embodiment a salt is added to the mixture comprising a polyurethane prepolymer and curing agent prior to cure. The salt may be first dissolved or suspended in the prepolymer or curing agent prior to mixing, or added to the prepolymer/curing agent mixture before curing occurs. An organic solvent may be used to assist in the dissolution or suspension of the salt. In one embodiment a solvent is used to dissolve the prepolymer or isocyanate monomer and the salt is suspended in the resulting solution.

In other embodiments a salt is incorporated into an already cured thermoplastic or elastomeric polyurethane resin by contacting the polyurethane with a solution of the salt in a solvent, which solvent swells the polyurethane. The salt is thus incorporated into the swelled polymer. The swelled polymer can be used in the separator as is, or the solvent can be removed, e.g., by evaporation, leaving a dried polyurethane polymer comprising an imbibed salt. Of course a dried polyurethane polymer comprising an imbibed salt may be swelled again during manufacture or operation of the flow cell. Alternatively, a polyurethane resin can be dissolved in a solvent along with a dissolved or suspended salt, to generate, after solvent removal, a polyurethane polymer comprising an embedded salt.

Solvents useful for dissolving or suspending salts useful in the present invention, or for dissolving, suspending or otherwise diluting the polyols, isocyanate monomers, prepolymers, curing agents and polyurethane useful in the present invention are well known in the art and are readily optimized by the practitioner.

In other embodiments, a thermoplastic or elastomeric polyurethane is heated to become soft or molten, and the salt is compounded into the softened or molten polyurethane. In one particular embodiment a salt is incorporated into a thermoplastic polyurethane by extrusion, however, any common heat processing method may be used.

The polycarbonate based polyurethane composition of the present invention may also optionally include solids other than those salts described above. For example, inorganic oxides, compound oxides, silicates, sulfates, sulfides, carbonates, phosphates, nitrides, amides, imides and carbides of the elements of the 1st, 2nd, 3rd or 4th main group or the 4th subgroup of the periodic table. Examples include calcium oxide, silica, alumina, magnesium oxide titanium dioxide; mixed oxides of silicon, calcium, aluminum, magnesium and titanium; silicates such as talc; calcium carbonate, magnesium carbonate, barium carbonate, lithium carbonate, potassium carbonate, sodium carbonate; sulfates of alkali metals and alkaline-earth metals; polymer particles of e.g., polyethylene, polypropylene, polystyrene, polytetrafluoroethylene, polyvinylidene fluoride; polyamides, polyimides; ceramics, lithium sulfide-phosphorus sulfide glassy particles, and surface-treated fillers.

Typically, the solids have a primary particle size of from 5 nm to 25 microns, e.g., from 0.01 to 10 microns e.g., from 0.01 to 5 microns, or 0.01 to 1 microns, as determined by electron microscopy. The solids may be symmetrical in their external shape, i.e., have a dimensional ratio of height:width:length (aspect ratio) of about 1 and be shaped as spheres or pellets, be approximately round in shape, or else be in the shape of any desired polyhedron, such as cuboid, tetrahedron, hexahedron, octahedron or bipyramid; or they may be distorted or asymmetric, i.e., have a dimensional ratio height:width:length (aspect ratio) which is not equal to 1 and be, for example, in the form of needles, asymmetrical tetrahedra, asymmetrical bipyramids, asymmetrical hexa- or octahedra, lamellae or plates, or have fiber-like shape. If the solids are asymmetric particles, the upper limit given above for the primary particle size refers to the smallest axis in each case. The solids may also be fibers or nanofibers.

The polyurethane compositions of the present invention may also optionally include conventional additives in conventionally used amounts, for example, processing aids, stabilizers, and other additives as desired. Any of these optional solids or conventional additives may be present in, or excluded from, the polyurethane compositions of the invention.

In some embodiments the separator comprises other polymers in addition to the polycarbonate based polyurethane as part of a polymer blend. In some embodiments the separator of the invention comprises a polymer blend comprising a polycarbonate based polyurethane resin and, for example, other polyurethane resins such as polyether based polyurethanes, polyester based polyurethanes, polycaprolactone based polyurethanes etc.; polyethers; polyacrylates; polyesters; polyolefins; polyamides; polystyrenes; polynitriles such polyacrylonitrile and nitrile rubbers; epoxy resins; polyvinylidenedifluorides; polyacetals, polyvinylchlorides; polycarbonates; polyphenylene sulfides and the like including copolymers and blends thereof. In most embodiments wherein the separator comprises a blend comprising a polycarbonate based polyurethane and other polymers, at least 50, 60, 70, 80, 90, 95 wt % or more, based on the total weight of the polymers in the polymer blend is one or more polycarbonate based polyurethane resin. In many embodiments 90 to 100% or 95 to 100% of all polymers in the blend is one or more polycarbonate polycarbonate based polyurethane.

In other embodiments the separator of the invention comprises polymers in addition to the polycarbonate based polyurethane as part of a separate component, e.g., the separator may comprise components such as a support layer, a supporting mesh, a frame, embedded particles etc., that comprise, in part or in total, polymers other than a polycarbonate based polyurethane.

The polycarbonate based polyurethane typically is, or is part of, a film or thin section, There is no particular limitation of the thickness of the film or thin section, but in some embodiments the polycarbonate based polyurethane is present in a layer that is from 0.1 to 750 microns thick, e.g., 50 to 500, 50 to 100, 10 to 50, 100 to 300 or 100 to 250 microns thick.

The separator of the invention may be of any usable construction, and the polyurethane of the invention can be incorporated in any usable form. For example the separator may be a self-supporting single-layer polymer film, a gel electrolyte, a film or other polymer matrix comprising a solvent, a polymer matrix comprising a solution of an electrolyte salt in an organic solvent, a layered or laminated film or other object wherein one of the layers comprises the polyurethane of the invention, a polymer matrix comprising the polyurethane of the invention supported on a mesh, etc.

In some embodiments, a multi-layered separator of the invention is an article wherein a layer comprising the polycarbonate based polyurethane is laminated on a support, such as a chemically inert porous support, or sandwiched between multiple support layers. The separator may be a substrate laminated onto or sandwiched in between one or more active components such as current collectors. A support may also be a mesh or other structure upon which the layer comprising the polycarbonate based polyurethane is laminated, or the mesh may be engulfed by the polycarbonate based polyurethane layer of the invention. Generally when the polyurethane is a layer on a support no additional binder needed, however, in some embodiments a binder can be used to keep the layers together.

The separator of the invention is typically flexible, especially in single polymer layer embodiments. The separator may also be flexible in multi-layer embodiments, provided that the other layer(s) are also flexible, however, in some embodiments a support layer is rigid, making the separator less flexible.

There are many options for manufacturing the separators of the invention. They can be manufactured using casting techniques commonly used in forming elastomeric polyurethane articles from mixtures of prepolymers and curing agents; they can be formed from casting techniques commonly used in forming elastomeric or thermoplastic polyurethane articles from already cured elastomeric or thermoplastic polyurethane polymers; they can be prepared using extrusion or other thermal processes common in forming thermoplastic articles from existing polymers; or a combination of casting and thermal processing methods can be used. The separator may be formed prior to or during the production of the flow cell. Solvent used to swell the polymer of the inventive separator can be introduced at any point during production of the separator or flow cell, for example, the polycarbonate based polyurethane substrate of the separator may be already part of the energy storage device when it is swelled with solvent. The metal salt typically found in the separator can likewise be incorporated at any point during production of the separator or energy storage device.

In one embodiment, a separator of the invention comprising a polycarbonate based polyurethane is formed directly, i.e., concurrent with the formation of the polycarbonate based polyurethane, by casting a mixture comprising an isocyanate capped polycarbonate based prepolymer and curing agent, along with any optional components, into a mold and curing the mixture. In one embodiment, the mixture comprising the polycarbonate based prepolymer and curing agent also comprises a salt, such as a lithium salt, so that a separator further comprising said salt is directly formed.

In one embodiment, a polyurethane prepolymer is prepared from an isocyanate monomer and a polyol into which a salt is dissolved or suspended to prepare a prepolymer embedded with the salt. The prepolymer is then conveniently used as part of the mixture that is cast into a mold and cured to directly form a separator comprising a polycarbonate based polyurethane and a salt. An organic solvent may be used in solvating or suspending the salt. The polyol into which the salt is dissolved or suspended may be a polycarbonate based polyol that in incorporated into a polycarbonate based prepolymer, or it may be any other polyol, such as a polyether or polyester polyol that becomes part of a polycarbonate based polyurethane copolymer or blend.

In another embodiment, a separator of the invention comprising a polycarbonate based polyurethane and a salt is formed by casting a mixture comprising an isocyanate capped polycarbonate based prepolymer and curing agent, along with any optional components, into a mold, curing the mixture, and then soaking the cured material in a solution or suspension comprising an organic solvent and the desired salt. In certain embodiments the solvent is then removed, but often either the same solvent or a different solvent is incorporated into the separator at a later stage in the making of the energy storage device.

In other embodiments a polycarbonate based polyurethane resin is prepared in a first step or otherwise obtained, and then subsequently processed to form the separator. For example, in a simple permutation of the above processes, a mixture comprising a polycarbonate based prepolymer and curing agent can be prepared and cast, often without a mold, to form a thin section, e.g., a film, of polycarbonate based polyurethane resin which is then cut into an appropriate size and shape. Salts and or solvents can be incorporated into the polyurethane of the separator using any of the methods discussed above.

Other embodiments for preparing polyurethane films or other thin sections useful in the separators of the invention make use of other well-known methods for preparing films. For example, a polycarbonate based polyurethane can be dissolved or dispersed in a solvent along with any other desired components, including other polymers, metal salts, plasticizers, processing aids, other additives etc., to provide a mixture which is then applied to a support by, for example, casting, spraying, pouring, drawn down, dipping, spin coating, roller coating, printing etc., and then dried or cured. The film thus obtained can be removed from the support and can be used as is or further processed to incorporate other components, such as a metal salt and/or solvent, or to form the appropriate size and shape, etc. Solvents and other conditions used in this procedure are well known in the art and readily optimized by the practitioner.

Other embodiments for the manufacture of the separators make use of melt processing or other thermal processing techniques to mix, blend or compound the components of the separator and/or form the separator. For example, films or other thin sections comprising the polycarbonate based polyurethane resin of the invention and other desired components can be formed by injection molding, compression molding, kneading, extrusion, calendaring and the like can be used to prepare the separator itself, or to prepare a compounded polymer composition capable of being further processes into the separator. As above, a metal salt or other thermally stable material can be incorporated prior to or during the thermal processing, or in a subsequent step, but any solvent used to swell the separator will be incorporated after thermal processing.

In particular embodiments the separator of the inventive non-aqueous flow cell comprises a polycarbonate based polyurethane into which a lithium or sodium electrolyte salt has been imbibed or embedded, and wherein the polyurethane is swelled by the presence of a non-aqueous polar solvent, e.g., a cyclic carbonate, a lactone or acetonitrile. Any amount of electrolyte salt may be incorporated into the polyurethane, for example, in some embodiments the salt is present at from 1 to 25 wt %, e.g., 5 to 20 wt %, based on the total weight of the polyurethane composition. In these particular embodiments, each of the flowable electrolytes comprising an organic redox active material will also typically comprise the same lithium or sodium electrolyte salt and non-aqueous polar solvent as found in the polycarbonate based polyurethane of the separator.

In such particular embodiments, the electrolyte salt is a lithium salt as described above, typically a salt selected from $LiPF_6$, $LiBF_4$, $LiClO_4$, $LiAlCl_4$, $LiBr$, $LiAsF_6$ and $Li(CF_3SO_2)_2N$; e.g., $LiPF_6$, $LiBF_4$, $LiClO_4$, $LiAsF_6$ or $Li(CF_3SO_2)_2N$; and the solvent typically comprises a cyclic carbonate, an acyclic carbonate, a butyrolactone, dimethylsulfoxide, dimethylformamide, dimethyl acetamide, N-methyl-2-pyrrolidone or acetonitrile; in many embodiments the solvent comprises a cyclic carbonate or acetonitrile, e.g., ethylene carbonate, propylene carbonate or acetonitrile.

Flowable electrolytes of the flow cell comprise redox active organic compounds which are dissolved, suspended, or otherwise dispersed in an organic carrier, i.e., non-aqueous solvent. Many usable redox active organic compounds are known in the art and include, but are not limited to, quinones, hydroquinones, amines, anilines and other aromatic amines, nitroxides, other aromatic compounds, organic redox polymers, organometallic materials and the like.

For example, a variety of variously substituted quinone, hydroquinones, aromatic amines etc., can be found in US 2014/0370403. Other useful materials such as redox active polymers, including "p"-doped conductive polymers such as polyaniline or polyacetylene based materials, polynitroxide or other organic radical entities, carbonyl based organics, oxocarbons and carboxylates, can be found in US 2010/0047671, U.S. Pat. Nos. 8,722,226 and 8,778,552. These materials include, for example, electronically active organic polymers and electronically insulating organic polymers that are rendered electronically active by mixing or blending with an electronically conductive material, including polymers such as poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes); and solid inorganic conductive materials including metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In certain exemplary embodiments, flowable electrolytes of the invention that release electrons during discharge comprise organic redox materials such as unsubstituted or substituted benzene hydroquinones, naphthyl hydroquinones, anthrahydroquinones, aromatic amines such as unsubstituted or substituted anilines, thio ureas such as tetraalkyl thio ureas, and the like; and flowable electrolytes of the invention that accept electrons during discharge comprise organic redox materials such as unsubstituted or substituted benzene quinones, naphthyl quinones, anthraquinones, various unsubstituted or substituted aromatic heterocycles, such as nitrogen containing aromatic heterocycles, and the like. Many of these compounds and other suitable compounds are known in the art.

Current collectors of the inventive flow cell are electronically conductive, electrochemically inactive under the operation conditions of the cell, and can be in the form of a sheet, mesh, fiber, felt, or in any configuration that permits sufficient contact and flow rate of the flowable electrolytes. During operation the flowable electrolytes flow by, or flow through the current collector, depending of the shape, porosity etc., of the current collector. The current collectors may be constructed using materials known in the art for the construction of current collector such electrodes, including for example, copper, aluminum, titanium, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, other forms of conductive carbon, various metal alloys, coated metals are also used.

The flow cell of the invention can be of any known general construction provided that it contains minimal amounts of water or no water and it comprises the polycarbonate based polyurethane separator of the invention. As an example, a flow cell of the invention may comprise:

an anode chamber through which, during discharge, a electrolyte comprising 1) a solvent, such as ethylene carbonate, propylene carbonate or acetonitrile, 2) a redox material that releases electrons during discharge, such as a N,N,N',N' tetraalkyl thio ureas, e.g., tetramethyl thio urea, or an aromatic amine or diamine, e.g., a polymethylated-p-phenylenediamine, and 3) in many embodiments a lithium salt;

a cathode chamber through which, during discharge, a electrolyte comprising 1) a solvent, such as ethylene carbonate, propylene carbonate or acetonitrile, 2) a redox material that accepts electrons during discharge, such as anthraquinone or tetramethyl benzene quinone, and 3) in many embodiments a lithium salt; and a separator/current collector assembly serving as a boundary between the anode and cathode chamber, which separator/current collector assembly comprises 1) a polycarbonate based polyurethane film, which film comprises a solvent, such as ethylene carbonate, propylene carbonate or acetonitrile, and a lithium salt such as $LiPF_6$, $LiBF_4$, $LiClO_4$, $LiAsF_6$ or $Li(CF_3SO_2)_2N$, 2) two layers of a porous graphite felt, through which the electrolytes flow, each layer adhered to an opposite side of the film, wherein one layer is part of the interior of the anode chamber and the other layer is part of the interior of the anode chamber, and 3) and two electrodes, one in contact with the layer of graphite felt in the anode chamber and the other in contact with the layer of graphite felt in the anode chamber.

The separator of the invention provides a non-aqueous flow cell with improvements in ion selectivity and conductivity while maintaining excellent mechanical and dimensional stability.

EXAMPLES

Sample flow cell separator membranes of the invention comprising bis(trifluoromethane) sulfonimide lithium salt (LiTFSI), were prepared from 150 to 200 micron thick films of polycarbonate based polyurethane, which films were either prepared by directly incorporating LiTFSI into the film by adding to the polycarbonate prepolymer/curative casting mixture, or by casting the polyurethane film without LiTFSI and then imbibing the salt into the film by soaking the film in a solution of the salt. Comparative membranes were likewise prepared from polyethylene glycol prepolymer. The sample membranes were tested for solvent uptake, swelling and conductivity in the presence of organic solvents and lithium salts known to be suitable for use in flow cells using standard test methods modified when necessary to address specific issues raised by the physical and handling properties of the individual separator compositions.

Preparation of Li Doped Polyurethane Films

Example 1

Li doped polycarbonate based polyurethane film prepared directly by curing a low free monomer polycarbonate/PPDI Prepolymer with butane diol in the presence of LiTFSI To 0.25 g of PC/PPDI prepolymer ADIPRENE LFP 3940A was added a solution of 0.0375 grams of bis(trifluoromethane)sulfonimide lithium salt (LiTFSI) in 1 mL of propylene glycol monomethane ether acetate (PMAc). The mixture was stirred and heated with a 100° C. oil bath to completely dissolve the prepolymer, 0.0095 g of 1,4-butanediol was then added, the resulting mixture was stirred at 100° C. for 2 minutes, degassed under vacuum for 3 minutes and then poured onto a TEFLON coated silica wafer heated on a 110° C. hotplate, held there to allow most of the remaining solvent to evaporate and then placed in an oven at 110° C. to post cure for 16 hours to provide a 150-200 micron polyurethane film containing 15 wt % of lithium salt.

Example 2

Li doped polycarbonate based polyurethane films prepared by first casting a film from a mixture of a low free monomer polycarbonate/PPDI Prepolymer with butane diol and then soaking the film in a solution of bis(trifluoromethane)sulfonimide lithium salt.

Example 2 PC

Following the procedure of Example 1, but without adding any LiTFSI, provided a 150-200 micron polyurethane film containing no lithium salt. Samples of the film were soaked in a 1.0M LiTFSI/propylene carbonate solution at room temperature for various time periods, e.g., 4 hours, 24 hours, 3 days, 5 days, to allow for the LiTFSI salts imbibed into PC/PPDI polyurethane film after which the films were removed and patted dry.

Example 2 AcN

The procedure of Example 2 PC was repeated except that the polyurethane film was soaked in a 1.0M LiTFSI/AcN solution at room temperature for 4 hours, 24 hours, 3 days or 5 days, removed and patted dry.

Example 3

Following the procedures of Examples 1 and 2 but substituting one of the following amino curatives for butane diol, methylene dianiline, methylene bis chloroaniline, ethylene bis orthochloroaniline, 4,4'-methylene-bis(3-chloro-2,6-diethyl)aniline or dimethylthio-2,4-toluenediamine, generates polycarbonate polyurethane films from which separator membranes are formed as described herein.

Comparative Example A

Li doped polypropylene glycol (PPG) based polyurethane film prepared directly by curing a low free monomer PPG/TDI prepolymer with 3,3'-dichloro-4,4'-diaminodiphenylmethane (MOCA) in the presence of LiTFSI To 0.25 grams PPG/TMDI prepolymer ADIPRENE LFG 964A, was added a solution of 0.0375 grams of LiTFSI in 1 mL of PMAc. The mixture was stirred and heated by a 70 C oil bath for approximately 10 minutes to completely dissolve the prepolymer, after which 0.046 grams of 3,3'-dichloro-4,4'-diaminodiphenylmethane (MOCA) was added, the resulting mixture was stirred at 70 C for 5 minutes to dissolve MOCA, degassed under vacuum for 3 minutes and then poured onto a TEFLON coated silica wafer heated on a 100 C hotplate. The cast film on the silica wafer was dried on the hotplate for an additional 10 minutes to allow most of the remaining solvent to evaporate and then placed in an oven at 100 C to post cure for 16 hours to provide a 150-200 micron polyurethane film containing 15 wt % of lithium salt.

Swelling of PUR Separator Membranes

Polycarbonate based polyurethane films of Example 1, Example 2 PC imbibed using a 4 hour soak in 1.0M LiTFSI/PC, Example 2 PC imbibed using a 5 day soak in 1.0M LiTFSI/PC, and Comparative Example A were cut into an appropriate shape a specific length for use as separators, weighed, and immersed in propylene carbonate (PC) containing 3% LiTFSI for 16 hrs after which the test separators were withdrawn from solvent contact and solvent adhering to the surface of the separator was removed by gentle pressing on a blotting paper. The weight and length was measured and compared to the weight and length prior to immersion. Films from Example 2 AcN imbibed using a 24 hour soak in a 1.0M LiTFSI/AcN solution were cut as above and then immersed in acetonitrile containing 3% LiTFSI for 16 hrs and then treated as above. Solvent uptake and percentage length gain are reported in Table 1.

Conductivity

The solvent soaked films were placed between two stainless steel electrodes with a diameter of 1.27 cm using spring loading for good contact between electrode and film. The impedance of the sample was measured according to standard procedures over the frequency range of 0.1 Hz to 100 kHz with a 5 mV ac modulation using a Solartron-1260 gain-phase analyzer controlled by Z-plot software. The impedance spectrum plotted over the complex plane provides the bulk resistance (R) which is derived from the extrapolation of the real component value Z' at the imaginary component Z"=0. The sample conductivity (cr) is calculated using the equation: cr=L/RA, where L is the thickness of the membrane and A is the area of the electrode. The results are summarized in Table 1.

TABLE 1

Properties of PUR separator membranes at room temperature

| Film | Conductivity (S/cm) | Solvent Uptake (%) | Length gain (%) |
|---|---|---|---|
| Ex 1 | $1.1 \times 10^{-5}$ | 57 | 9.5 |
| Ex 1 PC/4 h soak | $3.1 \times 10^{-5}$ | 43 | 5.0 |
| Ex 1 PC/5 d soak | $3.9 \times 10^{-5}$ | 49 | 7.4 |
| Ex 2 AcN/24 h soak | $1.2 \times 10^{-4}$ | 30* | 3.8* |
| Comp Ex A | $3.4 \times 10^{-4}$ | 187 | 40 |

*The film of Ex 2 was exposed to acetonitrile as solvent, the other films were exposed to propylene carbonate.

The separators of the invention exhibited acceptable to good conductivity and acceptable dimensional stability, i.e., solvent uptake and length gain, for use in the non-aqueous flow cell of the invention. The comparative separator exhibited good conductivity but had unacceptable solvent uptake and length gain for use in the non-aqueous flow cell of the invention.

The invention claimed is:

1. A non-aqueous flow cell comprising an anode region, a cathode region and an ion permeable, single layer or multilayer, non-porous polyurethane separator situated between the anode region and cathode region wherein:
   the anode region comprises an anode chamber, a current collector residing within the anode chamber, and a non-aqueous flowable organic electrolyte in the form of a solution, slurry or dispersion comprising an organic redox active compound that releases electrons during discharge of the cell and an organic solvent,
   the cathode region comprises a cathode chamber, a current collector residing within the cathode chamber, and a non-aqueous flowable organic electrolyte in the form of a solution, slurry or dispersion comprising an organic redox active compound that accepts electrons during discharge of the cell and an organic solvent,
   the separator comprises an ion permeable non-porous film layer formed from a polycarbonate based polyurethane prepared by curing a mixture comprising an isocyanate terminated pre-polymer having a polycarbonate backbone and a curing agent comprising a $C_{2-12}$ diol, methylene dianiline, methylene bis chloroaniline, ethylene bis orthochloroaniline, 4,4'-methylene-bis(3-chloro-2,6-diethyl)aniline, dimethylthio-2,4-toluenediamine, di-p-aminobenzoate, phenyldiethanol amine mixture, or methylene dianiline sodium chloride complex,
   wherein the anode electrolyte, the cathode electrolyte and the separator each comprise less than 10% by weight of water.

2. The non-aqueous flow cell according to claim 1 wherein the polycarbonate based polyurethane of the separator comprises a metal salt and/or an organic solvent.

3. The non-aqueous flow cell according to claim 2 wherein the polycarbonate based polyurethane of the separator comprises a metal salt and an organic solvent.

4. The non-aqueous flow cell according to claim 3, wherein each of the flowable electrolytes further comprise a metal salt.

5. The non-aqueous flow cell according to claim 2, wherein the polycarbonate based polyurethane of the separator comprises a lithium or sodium salt.

6. The non-aqueous flow cell according to claim 5, wherein the polycarbonate based polyurethane of the separator comprises a lithium salt selected from the group consisting of lithium halides, lithium borates, lithium aluminates, lithium aluminosilicates, lithium-containing zeolites, lithium carbides, lithium oxides, lithium phosphates, lithium silicates, lithium sulfides, lithium sulfates.

7. The non-aqueous flow cell according to claim 6, wherein the lithium salt is selected from the group consisting of lithium hexafluorophosphate, lithium tetrafluoroborate, lithium perchlorate, lithium tetrachloroaluminate, lithium bromide, lithium hexafluoroarsenate and lithium bis(trifluoromethanesulfonyl) imide.

8. The non-aqueous flow cell according to claim 4, wherein each of the flowable electrolytes and the polycarbonate based polyurethane of the separator comprise a lithium salt selected from the group consisting of lithium halides, lithium borates, lithium aluminates, lithium aluminosilicates, lithium-containing zeolites, lithium carbides, lithium oxides, lithium phosphates, lithium silicates, lithium sulfides, lithium sulfates.

9. The non-aqueous flow cell according to claim 8, wherein each of the flowable electrolytes and the polycarbonate based polyurethane of the separator comprise the same lithium salt.

10. The non-aqueous flow cell according to claim 8, wherein the lithium salt is selected from the group consisting of lithium hexafluorophosphate, lithium tetrafluoroborate, lithium perchlorate, lithium tetrachloroaluminate, lithium bromide, lithium hexafluoroarsenate and lithium bis(trifluoromethanesulfonyl) imide.

11. The non-aqueous flow cell according to claim 9, wherein the lithium salt is selected from the group consisting of lithium hexafluorophosphate, lithium tetrafluoroborate, lithium perchlorate, lithium tetrachloroaluminate, lithium bromide, lithium hexafluoroarsenate and lithium bis(trifluoromethanesulfonyl) imide.

12. The non-aqueous flow cell according to claim 6 wherein each of the flowable electrolytes comprise at least one organic solvent selected from the group consisting of ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, butyrolactone, ethyl acetate, methyl propionate, ethyl propionate, dimethoxyethane, diethoxyethane, tetrahydrofuran, 2-methyl tetrahydrofuran, 1,3-dioxolane, 4-methyl-1,3-dioxolane, diethyleneglycol diethylether, triethyleneglycol diethylether, dimethylsulfoxide, sulfolane, methylsulfolane, dimethylformamide, dimethyl acetamide, N-methyl-2-pyrrolidone, acetonitrile and propiononitrile.

13. The non-aqueous flow cell according to claim 9 wherein each of the flowable electrolytes and the polycarbonate based polyurethane of the separator comprise at least one organic solvent selected from the group consisting of ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate, butyrolactone, ethyl acetate, methyl propionate, ethyl propionate, dimethoxyethane, diethoxyethane, tetrahydrofuran, 2-methyl tetrahydrofuran, 1,3-dioxolane, 4-methyl-1,3-dioxolane, diethyleneglycol diethylether, triethyleneglycol diethylether, dimethylsulfoxide, sulfolane, methylsulfolane, dimethylformamide, dimethyl acetamide, N-methyl-2-pyrrolidone, acetonitrile and propiononitrile.

14. The non-aqueous flow cell according to claim 13, wherein each of the flowable electrolytes and the polycarbonate based polyurethane of the separator comprise the same organic solvent.

15. The non-aqueous flow cell according to claim 14, wherein the organic solvent comprises at least one solvent selected from the group consisting of ethylene carbonate, propylene carbonate, butylene carbonate, dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate, butylpropyl carbonate and acetonitrile.

16. The non-aqueous flow cell according to claim 15 wherein the lithium salt is selected from the group consisting of lithium hexafluorophosphate, lithium tetrafluoroborate, lithium perchlorate, lithium tetrachloroaluminate, lithium bromide, lithium hexafluoroarsenate and lithium bis(trifluoromethanesulfonyl) imide.

17. The non-aqueous flow cell according to claim 1 wherein the separator is an article wherein the non-porous film layer formed from the polycarbonate based polyurethane is laminated on a chemically inert porous support.

18. The non-aqueous flow cell according to claim 17 wherein the separator is an article wherein the non-porous film layer formed from the polycarbonate based polyurethane is sandwiched between multiple support layers.

19. The non-aqueous flow cell according to claim 1 wherein at least one current collector comprises a porous graphite felt.

20. The non-aqueous flow cell according to claim 19 wherein each current collector comprises a porous graphite felt and each is adhered to an opposite side of the separator.

* * * * *